(12) United States Patent
Marks et al.

(10) Patent No.: US 7,758,414 B1
(45) Date of Patent: Jul. 20, 2010

(54) METHOD OF PLAYING A SLOT MACHINE GAME ("DIRECTIONAL WILDS")

(75) Inventors: Daniel M. Marks, Brooklyn, NY (US);
Anthony M. Singer, Ringwood, NJ (US); Howard M. Marks, Westport, CT (US); Joseph D. Masci, Ossining, NY (US)

(73) Assignee: PTT, LLC, Mahwah, NJ (US)

( * ) Notice: Subject to any disclaimer, the term of this patent is extended or adjusted under 35 U.S.C. 154(b) by 689 days.

(21) Appl. No.: 10/663,979

(22) Filed: Sep. 17, 2003

Related U.S. Application Data

(60) Provisional application No. 60/412,012, filed on Sep. 20, 2002.

(51) Int. Cl.
*G06F 17/00* (2006.01)
*G06F 19/00* (2006.01)

(52) U.S. Cl. .................... 463/20; 463/1; 463/16; 463/17; 463/18; 463/19; 273/138.1; 273/139

(58) Field of Classification Search .............. 463/1, 463/16–20; 273/138.1, 139
See application file for complete search history.

(56) References Cited

U.S. PATENT DOCUMENTS

| | | | |
|---|---|---|---|
| 5,580,053 A | 12/1996 | Crouch | |
| 5,980,384 A * | 11/1999 | Barrie | 463/16 |
| 6,089,977 A * | 7/2000 | Bennett | 463/20 |
| 6,251,013 B1 * | 6/2001 | Bennett | 463/13 |
| 6,419,579 B1 * | 7/2002 | Bennett | 463/20 |
| 6,439,993 B1 * | 8/2002 | O'Halloran | 463/16 |
| 6,517,432 B1 * | 2/2003 | Jaffe | 463/16 |
| 6,561,900 B1 * | 5/2003 | Baerlocher et al. | 463/20 |
| 6,565,433 B1 * | 5/2003 | Baerlocher et al. | 463/20 |
| 6,585,264 B2 * | 7/2003 | Benett | 273/143 R |
| 6,786,818 B1 * | 9/2004 | Rothschild et al. | 463/20 |
| 6,805,349 B2 * | 10/2004 | Baerlocher et al. | 273/138.2 |
| 6,866,583 B2 * | 3/2005 | Glavich et al. | 463/20 |
| 6,875,106 B2 * | 4/2005 | Weiss et al. | 463/20 |
| 6,981,635 B1 * | 1/2006 | Hughs-Baird et al. | 235/375 |
| 6,997,808 B2 * | 2/2006 | Rodgers et al. | 463/30 |
| 7,040,985 B2 * | 5/2006 | Vancura | 463/20 |
| 7,070,502 B1 * | 7/2006 | Bussick et al. | 463/20 |
| 7,195,559 B2 * | 3/2007 | Gilmore et al. | 463/20 |
| 7,237,775 B2 * | 7/2007 | Thomas et al. | 273/143 R |
| 7,252,592 B2 * | 8/2007 | Rodgers et al. | 463/30 |
| 7,396,279 B2 * | 7/2008 | Berman et al. | 463/16 |
| 7,559,837 B1 * | 7/2009 | Yoseloff et al. | 463/21 |
| 2002/0052233 A1 * | 5/2002 | Gauselmann | 463/20 |
| 2003/0022712 A1 * | 1/2003 | Locke | 463/20 |
| 2003/0064802 A1 * | 4/2003 | Rodgers et al. | 463/30 |
| 2004/0033827 A1 * | 2/2004 | Gilmore et al. | 463/20 |
| 2005/0130737 A1 * | 6/2005 | Englman et al. | 463/25 |
| 2005/0148384 A1 * | 7/2005 | Marks et al. | 463/20 |

* cited by examiner

*Primary Examiner*—Peter DungBa Vo
*Assistant Examiner*—Milap Shah

(57) ABSTRACT

An electronic video slot machine enables wild symbols to expand into adjacent symbols positions—vertically, horizontally, and/or diagonally—in the symbol matrix ("Directional Wilds"). In one embodiment, the Directional Wild concept uses wild symbols that expand in a pre-determined vertical direction—upwards or downwards. The upwards wild symbol ("Up Wild") converts all of the symbol positions above the Up Wild into wild symbols. The downwards wild symbol ("Down Wild") converts all of the symbol positions below the Down Wild into wild symbols. The original position of the Up or Down Wild symbol is also optionally wild. Various alternative embodiments may optionally be used.

3 Claims, 12 Drawing Sheets

METHOD OF PLAYING A SLOT MACHINE GAME ("DIRECTIONAL WILDS")

RELATED APPLICATIONS

This application claims priority to U.S. Provisional Application No. 60/412,012, filed on Sep. 20, 2002 entitled "Card Games and Computer Implemented Games Using Interactive Network System for Implementing Same," and incorporated herein by reference.

BACKGROUND OF THE INVENTION

1. Field of Invention

The present invention relates generally to payout methods in a mechanical, an electro-mechanical and/or computer-based slot machine-like games-of-chance and, more particularly, to a method, an apparatus, and a computer readable medium storing computer-executable instructions for providing awards based on "wild" symbols that expand into adjacent symbols positions—vertically, horizontally, and/or diagonally—in the symbol matrix.

2. Background Description

To play a conventional slot machine, a player deposits money in the form of coins, gaming tokens or paper currency either into a coin head or bill acceptor. The coins and gaming tokens are collected in a reservoir inside the gaming machine while the paper currency is collected in the bill acceptor inside the gaming machine. If the coins, gaming tokens or paper currency are validated as authentic, the player accrues the appropriate number of playing credits on a credit meter. For example, a twenty-five cent gaming machine will accrue four credits for each dollar deposited into the gaming machine.

After accruing credits on the credit meter, the player determines how many credits he wishes to wager on the next spin of the slot reels. After setting the wager, the player spins the reels by pressing the spin button or by pulling a handle. When the reels stop spinning, symbols are displayed on the slot reels. The player then collects credits for winning combinations, if any, according to a pay table. More specifically, the slot machine operates as follows:

Symbol Matrix. Slot symbols are displayed on 3 or more slot reels (also called "columns") placed adjacent to each other. Each column contains at least 3 rows, with a symbol in each row. The resulting matrix of symbols typically ranges from 3 columns by 3 rows with 9 total symbols to 5 columns by 3 rows with 15 total symbols. Within the symbol matrix, positions on the slot reels may be referred to according to column, from left to right, and row, from the top to bottom ("symbol positions"). For example: symbol position 1/2 is located in column 1 (i.e., left-most column) and row 2 (i.e., middle row).

Winning Combinations. Players collect credits for predetermined winning symbol combinations that appear in specific positions ("pay lines") on the slot reels. Winning combinations typically require that three or more of the same symbols appear adjacent to each other starting from the left-most position of a pay line ("line pays"). For example: a player may collect a line pay if 3 Banana symbols appeared in symbol positions 1/1, 2/1, 3/1 on a pay line using symbol positions 1/1, 2/1, 3/1, 4/1, and 5/1.

Players may also collect credits for predetermined winning combinations that appear anywhere on a pay line ("line scatter pays") or anywhere on the slot reels ("reel scatter pays"). For example, a player may collect a line scatter pay if 3 Banana symbols appeared in symbol positions 1/1, 3/1, 5/1 on a pay line using symbol positions 1/1, 2/1, 3/1, 4/1, and 5/1; and collect a reel scatter pay if 3 Banana symbols appeared anywhere on the slot reels.

Pay Table. Credits are awarded to the player for each winning symbol combination based on a predetermined schedule. For line pays and line scatter pays, the number of credits wagered on the winning pay line multiplies the number of credits indicated by the pay table. For example, a player may wager two credits each on five pay lines, spin the reels, and collect twice the amount indicated on the pay table for a line pay or line scatter pay appearing on any of the five played pay lines. For reel scatter pays, the total number of credits wagered multiplies the number of credits indicated by the pay table. For example, a player may wager ten total credits, spin the reels, and collect ten times the amount indicated on the pay table for a reel scatter pay appearing on anywhere on the slot reels.

Following any type of pay (e.g., line pays, line scatter pays, or reel scatter pays), credits won are added to the player's credit balance shown on the credit meter. As long as the player has credits on the credit meter, the player may continue to play the game. Following any spin, the player may collect the credit balance by pressing the Cash Out button.

A conventional slot machine issues awards according to the methods described above and exemplified by FIGS. 1, 2, and 3. FIG. 1, U.S. Pat. No. 5,580,053 to Crouch, entitled Multi-Line Gaming Machine, incorporated herein by reference, discloses a gaming machine 50 that has a display 51 on which an array of symbols is displayed. The array is typically 3 rows×5 columns. During a game the symbols displayed on the array are caused to change with a random result being obtained. The player of the machine makes a wager on the result and is paid a prize if one of a number of predetermined combinations of symbols are displayed on a line of the display 51 at the end of the game. The player may make multiple wagers on each game with each wager being assigned to a different one of a plurality of possible result lines. Typically, the number of possible result lines is greater than or equal to 9, and the lines to be employed in each game are selected by switches 54, prior to a game being initiated.

FIG. 2, as disclosed in U.S. Pat. No. 5,580,053, shows a 3×5 display 51 having 12 paylines, indicated by numerals 1 to 12 on the Figure. FIG. 3, as disclosed in U.S. Pat. No. 5,580,053, shows a 3×5 display 51 having 27 paylines, indicated by numerals 1 to 27 on the Figure. U.S. Pat. No. 5,580,053 also states that machines having a 3×3 or 3×4 display size.

Since conventional slot machines are limited to the foregoing methods, players, casinos and manufacturers suffer from the following disadvantages:

- Players suffer from the boredom of playing "new" games with different graphics, but really use same "old" awards;
- Casinos suffer from the players' dissatisfaction with the casino's game selection;
- Casinos cannot distinguish their game offerings from other casinos; and
- Game manufacturers suffer declining orders as they cannot distinguish their product line from the other manufacturers.

Many methods have been tried in the past to overcome these disadvantages, including the commonly known "wild" symbol feature which uses wild-card symbols to act as some or all of the other symbols and, therefore, help form additional winning line pay or scatter pay combinations. Other wild symbol features adopted in the past have included: "subset" wild that only acts as a sub-set of symbols in the symbol set; "roaming" wild that replaces each symbol in the symbol matrix one-at-a-time; and "chasing" wild that randomly replaces symbols in the symbol matrix one-at-a-time until the wild lands on particular symbol position.

It is an object of the present invention to overcome the limitations of conventional slot machines by using a novel wild symbol feature: "Directional Wilds." Unlike previous wild symbol features, the "directional" wild symbols expand into adjacent symbols positions—vertically, horizontally, and/or diagonally—in the symbol matrix. Thus, the Directional Wild concept creates an additional method of playing a slot game which benefits all parties: the game manufacturer adds a unique product to their sales line; the casino attracts and retains players interested in playing an innovative slot game; and the player enjoys a new method of receiving an award.

SUMMARY OF THE INVENTION

The present invention includes a variety of methods of play that can be programmed on an electronic video slot machine to enable wild symbols to expand into adjacent symbols positions—vertically, horizontally, and/or diagonally—in the symbol matrix ("Directional Wilds").

In a preferred embodiment of the present invention, the Directional Wild concept uses wild symbols that expand in a pre-determined vertical direction—upwards or downwards. The upwards wild symbol ("Up Wild") converts all of the symbol positions above the Up Wild into wild symbols. The downwards wild symbol ("Down Wild") converts all of the symbol positions below the Down Wild into wild symbols. The original position of the Up or Down Wild symbol is also wild.

For example, using the numbers 1 to 9 to represent the symbol set, with U representing the Up Wild symbol and D representing the Down Wild symbol:

| Before directional wild symbols expand: | | | | |
| --- | --- | --- | --- | --- |
| 9 | 1 | 6 | 8 | 3 |
| 4 | 5 | D | 3 | 7 |
| U | 3 | 7 | 6 | 2 |

| After directional wild symbols expand: | | | | |
| --- | --- | --- | --- | --- |
| U | 1 | 6 | 8 | U |
| U | 5 | D | 3 | 7 |
| U | 3 | D | 6 | 2 |

(Winning combinations in bold.)

Before expansion, each wild symbol occupies a single symbol position. After expansion, however, the U symbol in symbol position 1/3 grows upwards into symbol positions 1/2 and 1/1; and the D symbol in symbol position 3/2 grows downwards into symbol position 3/3. By using all of the U and D wild symbols, the game awards credits for the winning symbol combinations. In this example, the U and D wilds act as "3" and "5" symbols to make winning 5-5-5 and 3-3-3 combinations.

Alternatively, the present invention allows for many other embodiments, including but not limited to the following:

Any direction. The present invention allows for wild symbols to expand in any direction in the symbol matrix, including horizontally, vertically, diagonally, along a pre-determined path, and/or randomly. For example, a wild symbol in symbol position 1/2 may expand upwards to 1/1, left to 2/1, straight down to 2/2, and then diagonally down to 3/3.

Any method of determining direction. The present invention allows for any method of determining the direction of a wild symbol's expansion, including: pre-determined directions; directions based on player and/or third-party input; or one or more random directions. For example, a wild symbol may randomly expand in any one of 8 possible horizontal, vertical, or diagonal directions.

Any number of directions. The present invention allows for wild symbols to expand in one or more directions. For example, a wild symbol in symbol position 1/2 may expand 4 times: upwards to 1/1, left to 2/1, straight down to 2/2, and then diagonally down to 3/3.

In addition, the symbol may expand in multiple directions sequentially or simultaneously. For example, a wild symbol in symbol position 1/2 may sequentially expand upwards to 1/1 then left to 2/1; or a wild symbol in position 1/2 may simultaneously expand upwards to 1/1 and left to 1/2.

Any method of determining number of directions. The present invention allows for any method of determining the number of directions of a wild symbol's expansion, including: pre-determined number; number based on player and/or third-party input; or one or more random numbers within a pre-determined range. For example, a wild symbol may expand in up to 8 directions from any symbol position.

Any effect of wild symbols. The present invention allows wilds to have any effect upon the winning combinations formed using the wild symbol, including: increasing value; decrease value; awarding free spins; or any other pay out or award. For example, a wild symbol may double the value of any winning combination.

Any number of wild symbols. The present invention allows for any number of wild symbols to appear on the slot reels and expand into any number of other symbol positions. For example, wild symbols may appear at symbol positions 1/2, 3/1, and 4/3 and expand to cover all positions in the symbol matrix.

Any overlapping wild symbols. The present invention allows for different wild symbols to expand into the same symbol positions ("overlapping wild symbols"). For example, wild symbols may appear at symbol positions 1/2 and 2/1 and both expand into symbol position 2/2.

Any effect of overlapping wild symbols. The present invention allows for overlapping wild symbols to have any effect upon the winning combinations formed using the wild symbol, including: increasing value; decrease value; awarding free spins; or any other pay out or award. For example, two overlapping wild symbols that individually double the value of any winning combination may quadruple the value.

Any timing of awards. The present inventions allows for awards to be issued before the expansion of the wilds and/or after expansion of the wilds. For example, a winning combination may pay before expansion and then pay again after expansion.

In addition, the present invention may issue different types and/or amounts of awards issued before and after expansion. For example, a winning combination may pay 2× the amount indicated on the pay table before expansion and 1× the amount indicated after expansion.

Any wild symbol substitution properties. The present invention allows wilds to substitute for any or all other symbols, including: all symbols in the symbols set; a pre-determined sub-set of symbols; a sub-set of symbols determined by the player; a sub-set of symbols dependent on the wager level; a random sub-set of symbols; and/or any combination of these symbol sub-sets. For example, one wild symbol may substitute for "fruit" symbols only (i.e. cherries) and another wild symbol may substitute for "number" symbols only (i.e. 7's).

In addition, wild symbols may change their substitution properties after one or more spins, including spin-to-spin; pre-determined number of spins; number of spins determined by the player; number of spins determined by the wager level; a random number of spins symbols; and/or any combination of these methods. For example, a wild symbol may substitute for fruit symbols only on one spin and then change properties on the next spin to substitute for "number" symbols only.

All of these alternative embodiments rely upon the underlying Directional Wild concept to expand "wild" symbols into adjacent symbols positions—vertically, horizontally, and/or diagonally—in the symbol matrix.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The Detailed Description including the description of a preferred structure as embodying features of the invention will be best understood when read in reference to the accompanying figures wherein.

DETAILED DESCRIPTION OF A PREFERRED EMBODIMENT OF THE INVENTION

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

DESCRIPTION OF PREFERRED EMBODIMENT

Figure 1:
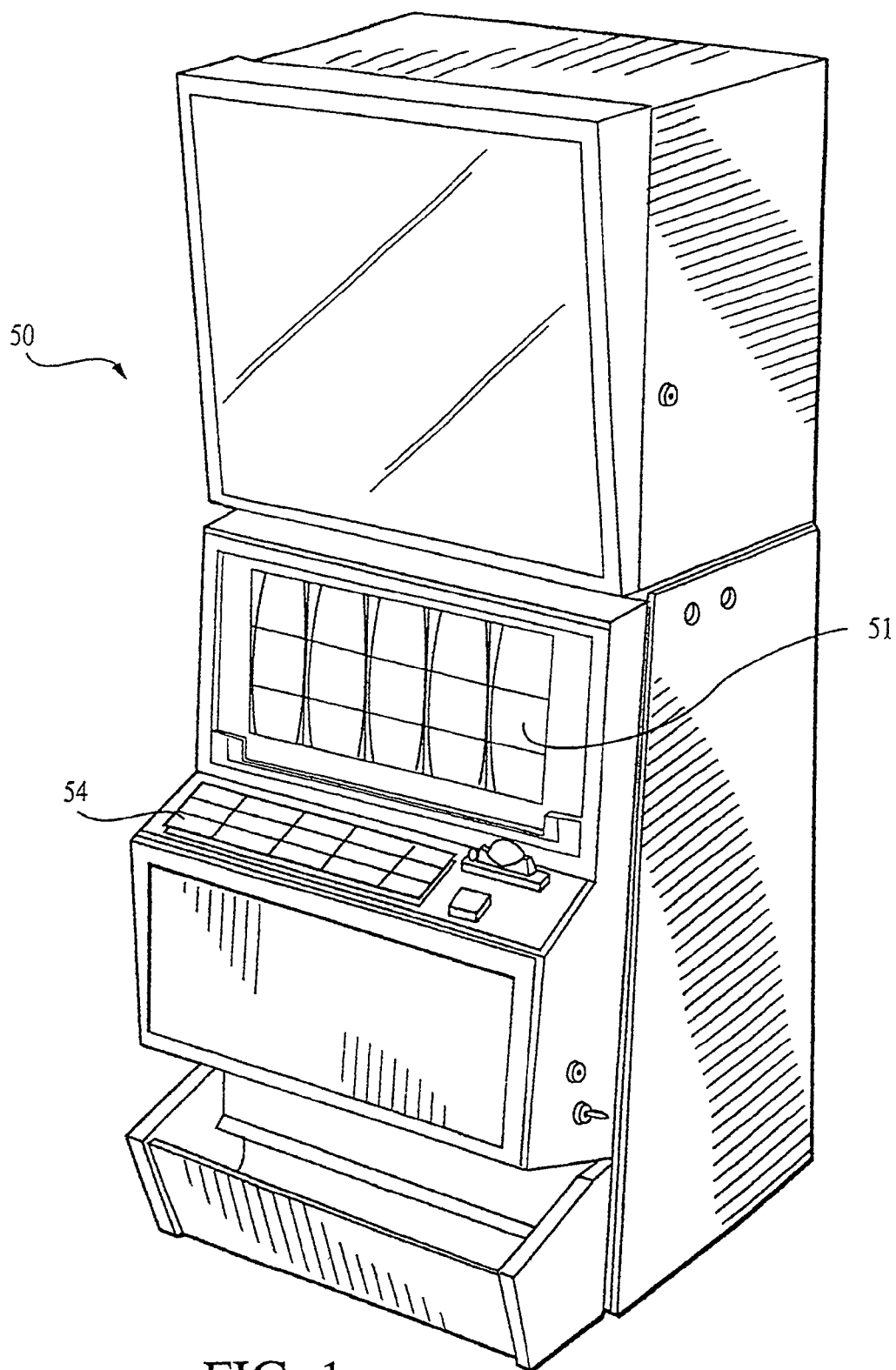
FIG. 1 illustrates a prior art slot machine.
Figure 2:
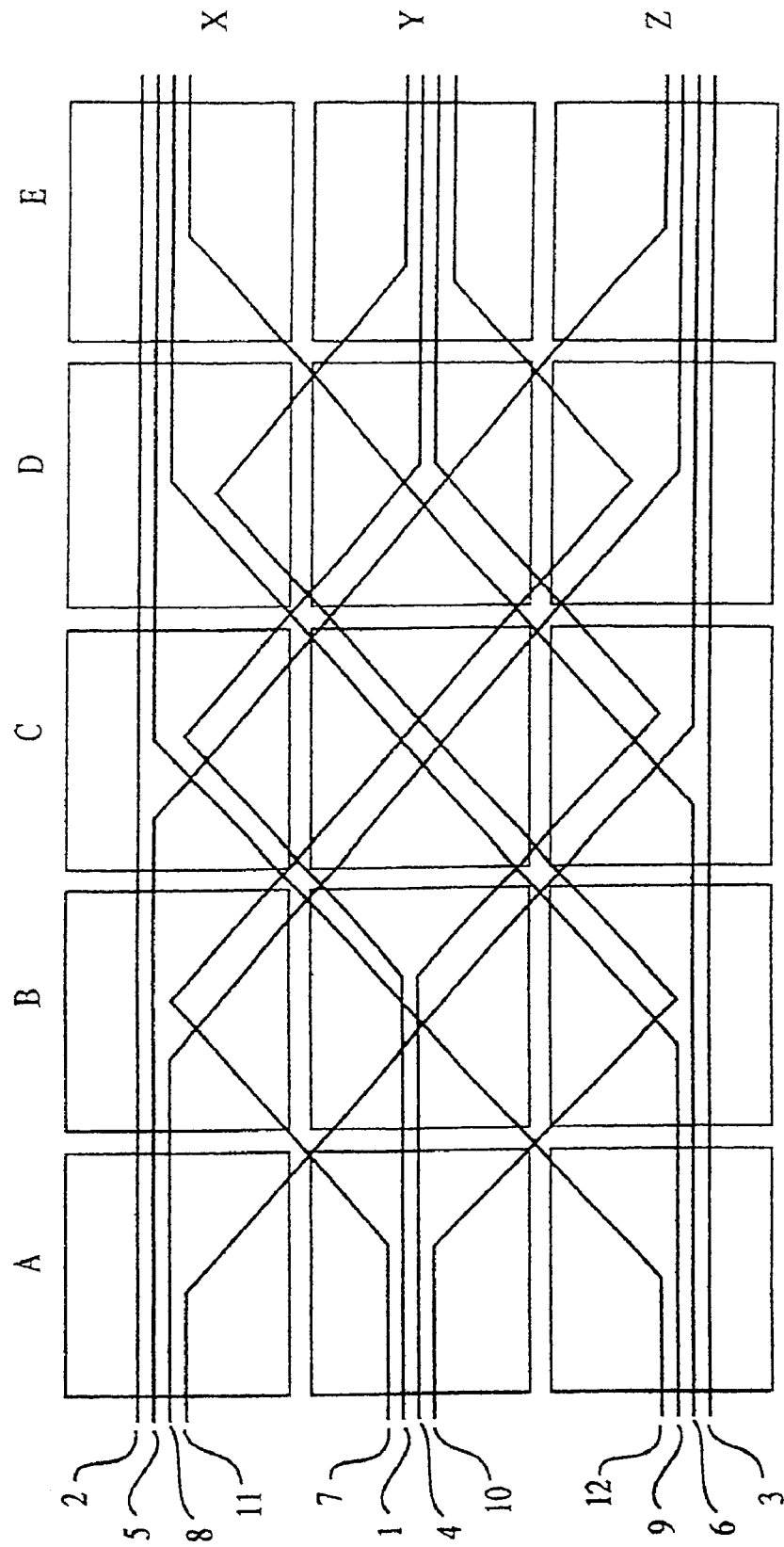
FIG. 2 illustrates a prior art 12 line multi-line pay arrangement for a machine with a 3×5 display format.
Figure 3:
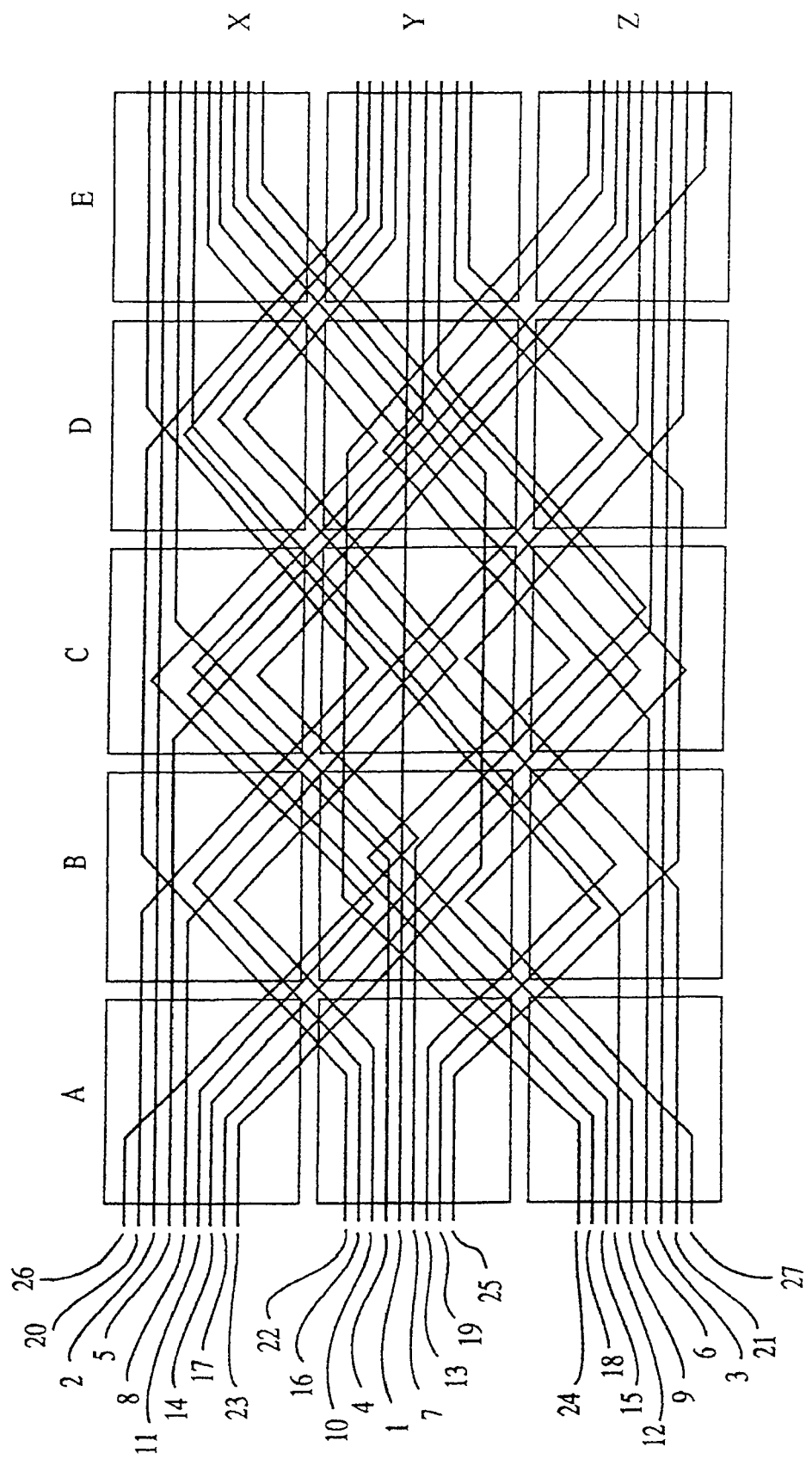
FIG. 3 illustrates a prior art 27 line multi-line pay arrangement for a machine with a 3.times.5 display format.
Figure 4A:
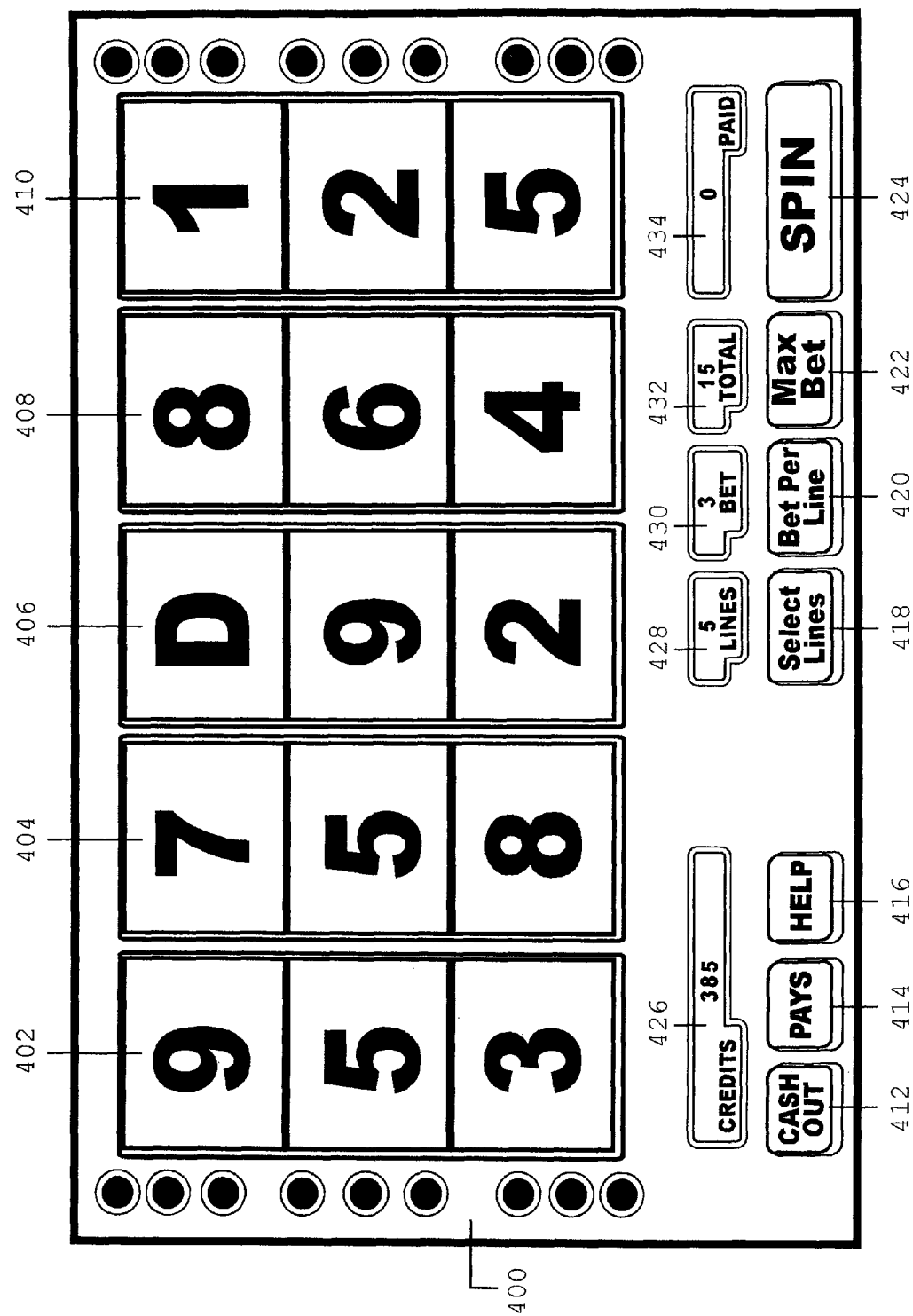
FIG. 4a-4h illustrates representative displays that may be encountered during a typical game in accordance with the principles of the present invention.

The preferred embodiment of the present invention includes the play of the base game using the Directional Wild concept, plus additional features, as described below:

Base Game. To play the base game, the player establishes a pool of credits, selects pay lines, sets the wager per pay line, spins the reels, and collects credits for winning symbol combinations. More specifically, the base game comprises the following elements:

Video Display. FIG. 4a shows the video display 400, including a 5-column by 3-row symbol matrix, as shown on the slot reels 402-410. The first column 402, second column 404, third column 406, fourth column 408 and fifth column 410 all hold three symbols. Alternatively, the game could utilize any number of columns and reels, such as a 3-column by 3-row symbol matrix.

Buttons. FIG. 4a shows a set of control buttons 412-424 used by the player to control the functions of the slot game. These buttons include Cash Out 412, Pay Table 414, Help 416, Select Pay Lines 418, Bet Per Line 420, Max Bet 422 and Spin 424. Any or all of these control buttons may be displayed on the video display 400 and/or buttons hard wired to the gaming device. If necessary, any number of buttons may be added or removed to further facilitate control of the games.

Meters. FIG. 4a shows a set of meters 426-434 used to display the salient information for the game, including Credits 426, Number of Pay Lines 428 Amount Bet Per Line 430, Total Bet 432, and Paid 434:

The Credits meter 426 displays the total number credits remaining in the credit pool.

The Number of Pay Lines meter 428 is associated with the Select Pay Lines button and displays the current number of Pay Lines Selected.

The Amount Bet Per Line 430 meter is associated with the Bet Per Line button 420 and displays the number of credits wagered per pay line.

The Total Bet 432 meter displays the cumulative value of the Number of Pay Lines 428 and Amount Bet Per Line 430.

The Paid meter 434 displays the number of credits won on the last spin.

Credit Pool. FIG. 4a shows the number of credits in the credit pool, as displayed on the Credits meter 426. The pool of credits increases and decreases according to the player's wins or losses and may be supplemented, if necessary, by the player by additional deposits of coins, tokens or paper currency.

Figure 5:
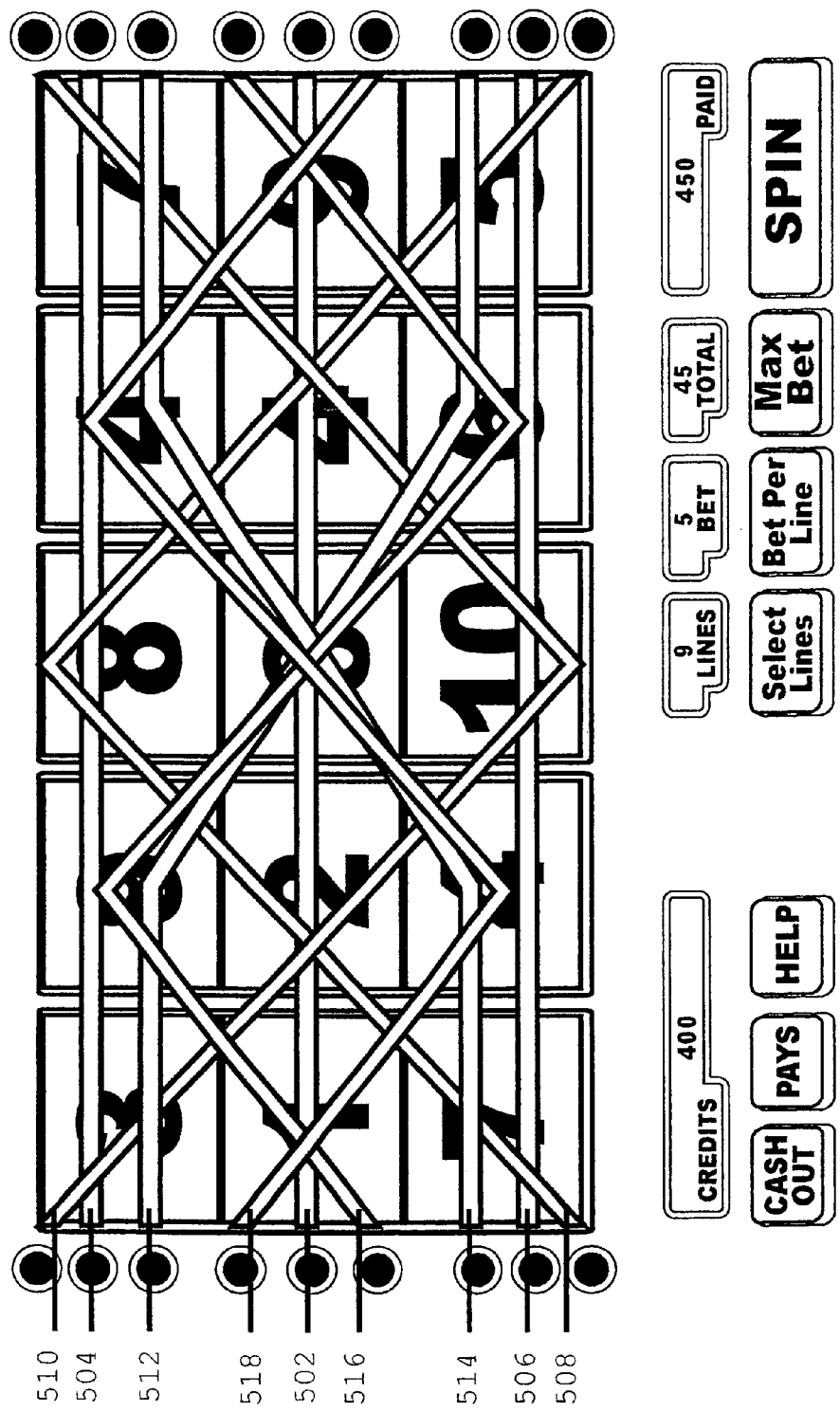
FIG. 5 illustrates the player-selected pay lines.

Select Pay Lines. FIG. 4a shows the number of pay lines upon which the player wagered, as displayed on the Number of Pay Lines meter 428. More specifically, FIG. 5 shows the location of the pay lines 502-518. The pay lines activate in a predetermined order, as follows:

The first wager is applied to pay line 1 at 502;
The second wager is applied to pay line 2 at 504;
The third wager is applied to pay line 3 at 506;
The fourth wager is applied to pay line 4 at 508;
The fifth wager is applied to pay line 5 at 510;
The sixth wager is applied to pay line 6 at 512;
The seventh wager is applied to pay line 7 at 514;
The eighth wager is applied to pay line 8 at 516;
The ninth wager is applied to pay line 9 at 518.

However, the games may have fewer or greater than nine pay lines and utilize any order of pay line activation.

Bet Per Line. FIG. 4a shows the number of credits wagered on each pay line, as displayed on the Bet Per Line meter 430. The same amount is wagered on each pay line. Alternatively, the player could be allowed to make wagers of different amounts on each pay line. The total amount wagered is determined by summing the amounts wagered on each pay line.

Total Bet. FIG. 4a shows the total number of credits bet on all of the pay lines, as displayed on the Total Bet meter 432. The total bet is calculated by multiplying Number of Pay Lines 428 by Bet Per Line 430.

Symbol Set. FIGS. 4a-h show the symbol set, as displayed on slot reels 402-410. Each of the symbols belongs to one of three groups: base symbols, scatter symbols, and directional wild symbols.

FIGS. 4a-h show base symbols 1 to 9. Base symbols provide line pays for three or more same symbols appearing adjacent to each other on an active pay line, from the leftmost pay line position towards the right.

Figure 4B:
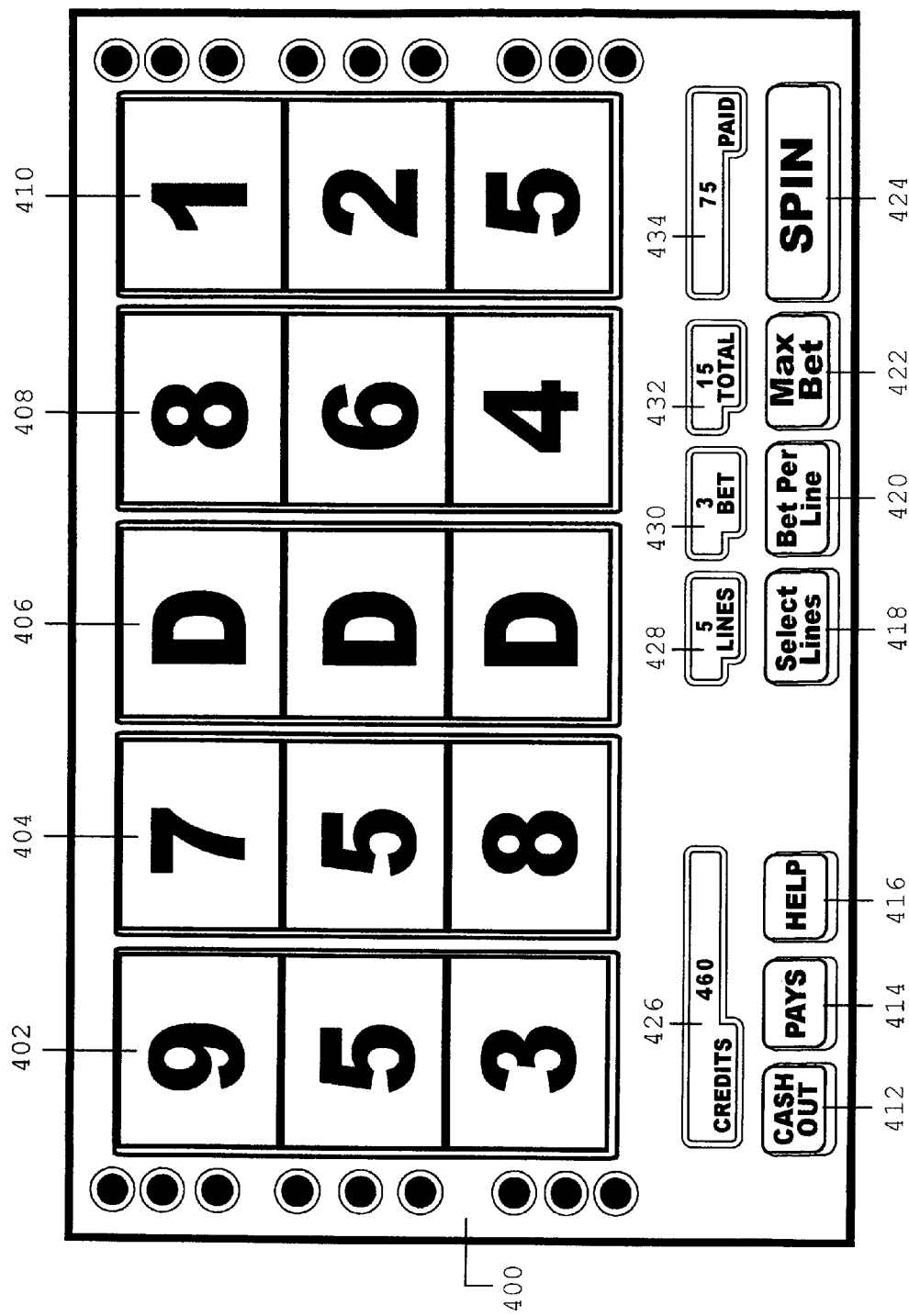
Figure 4C:
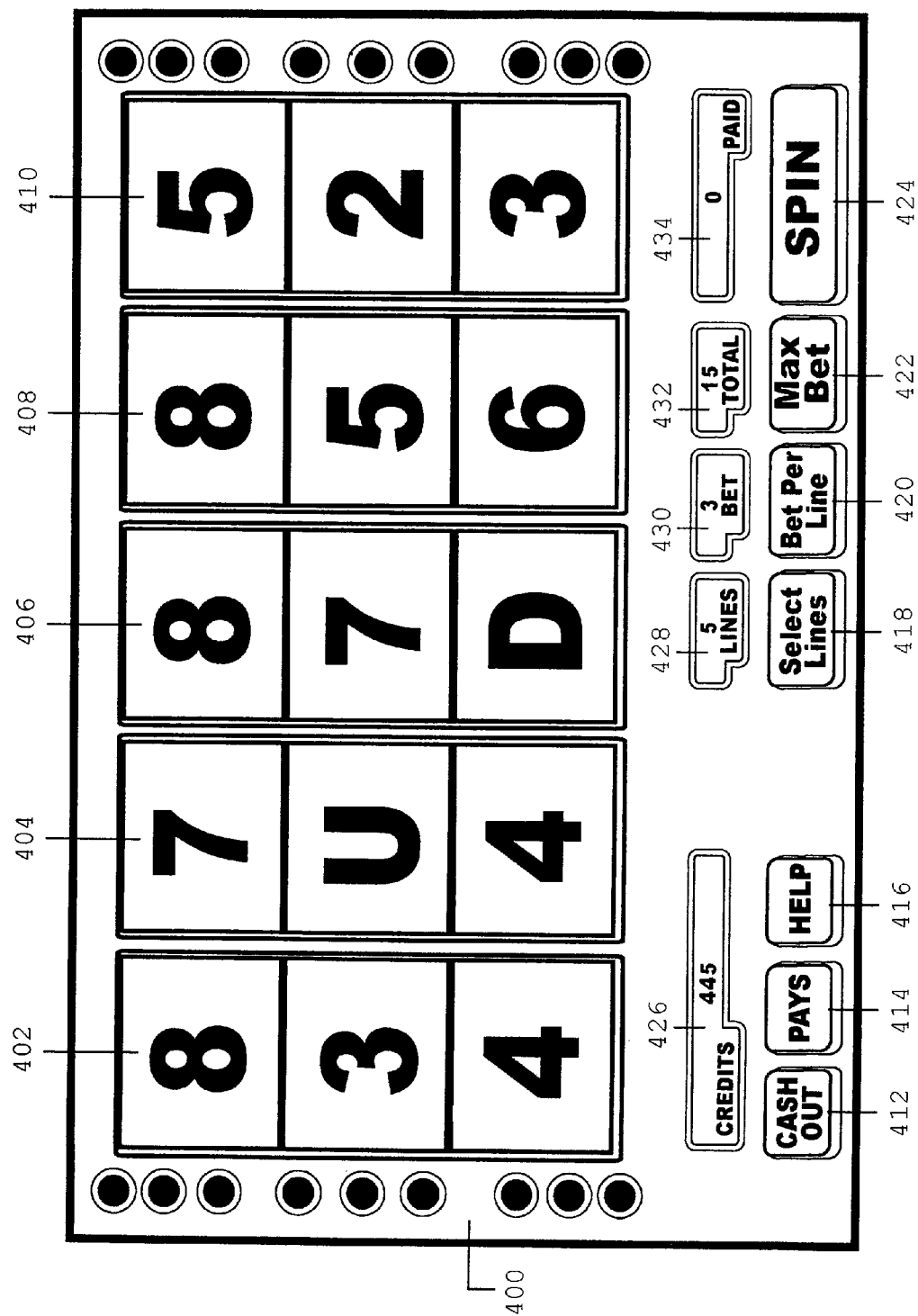
Figure 4D:
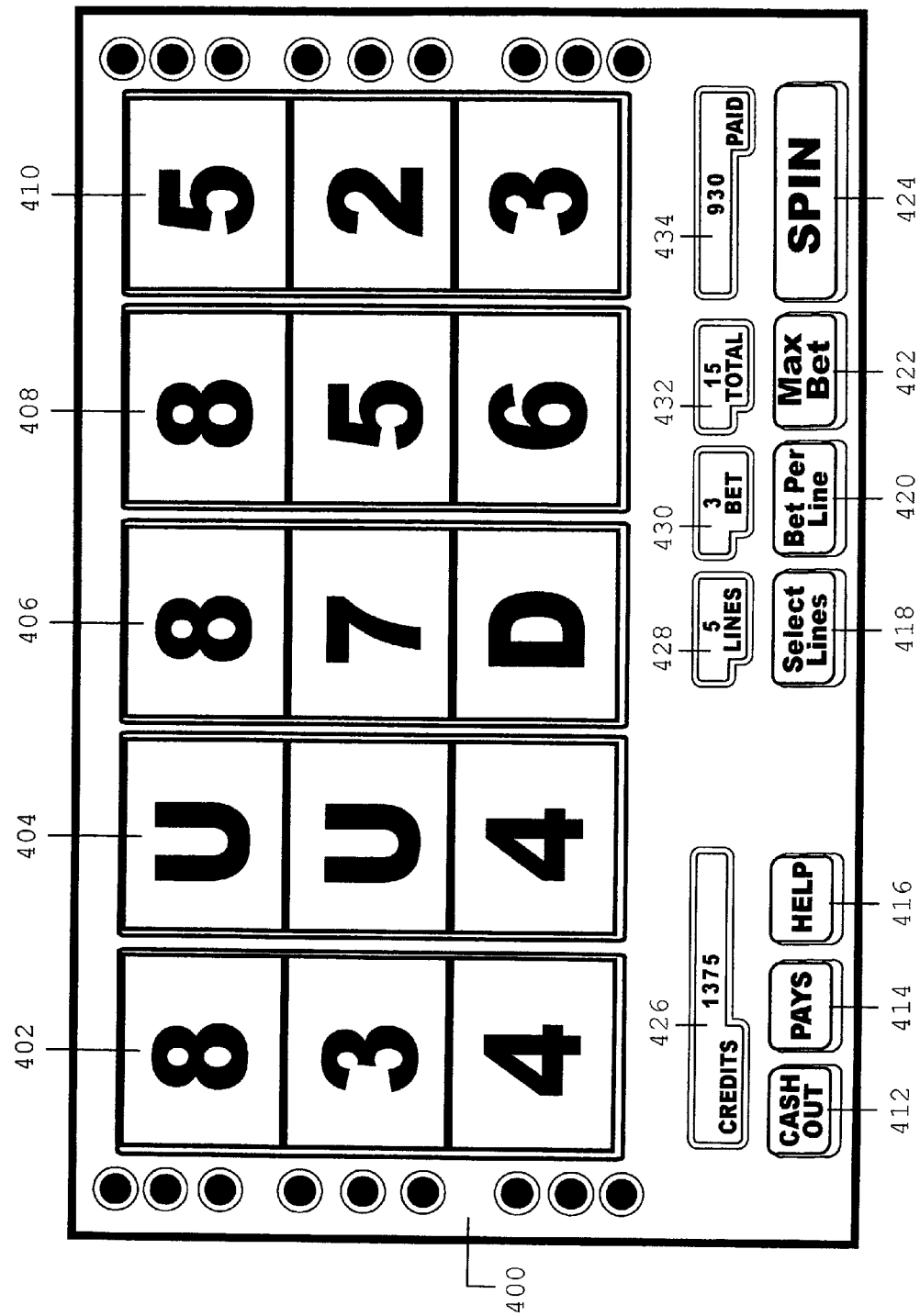
Figure 4E:
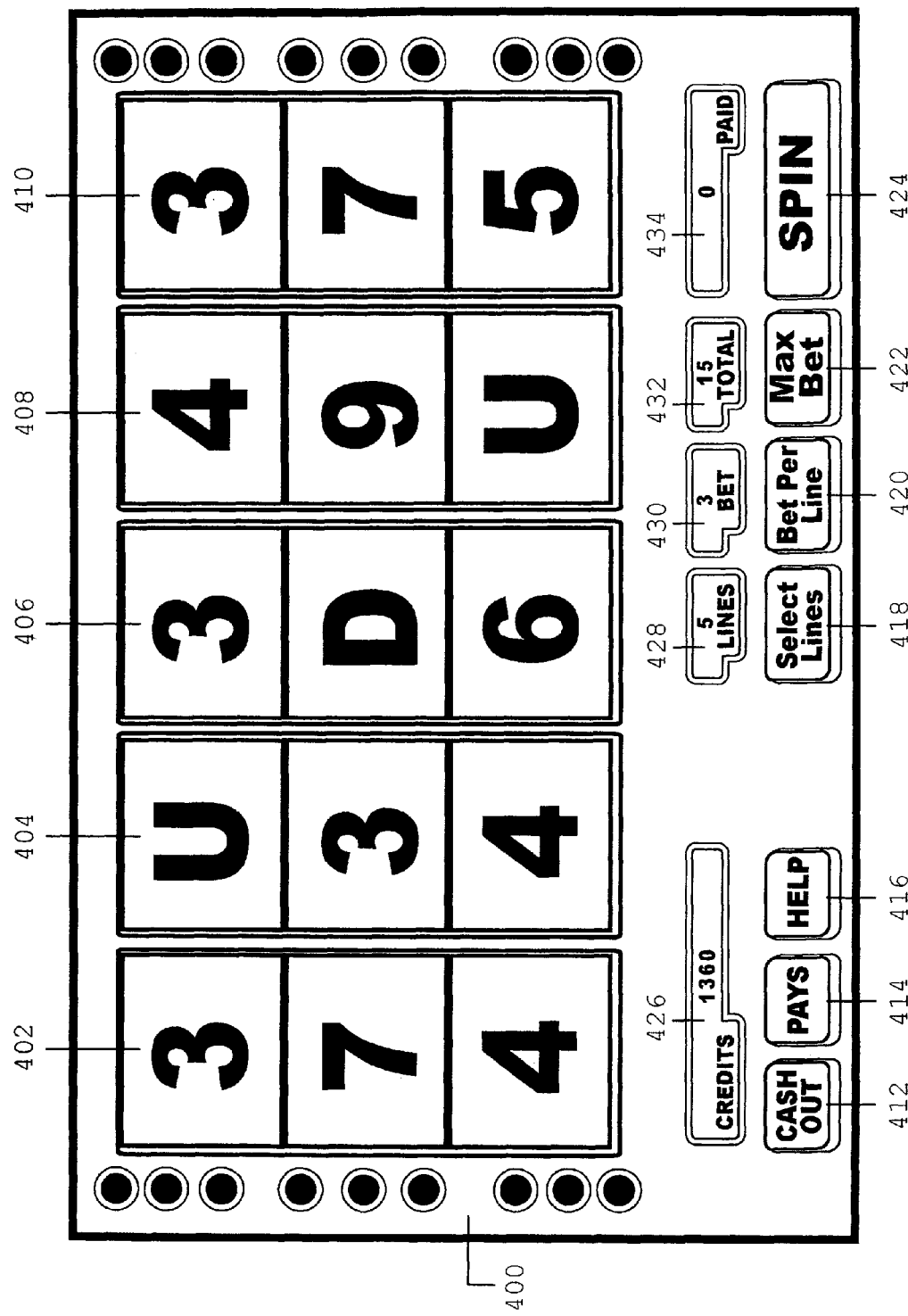
Figure 4F:
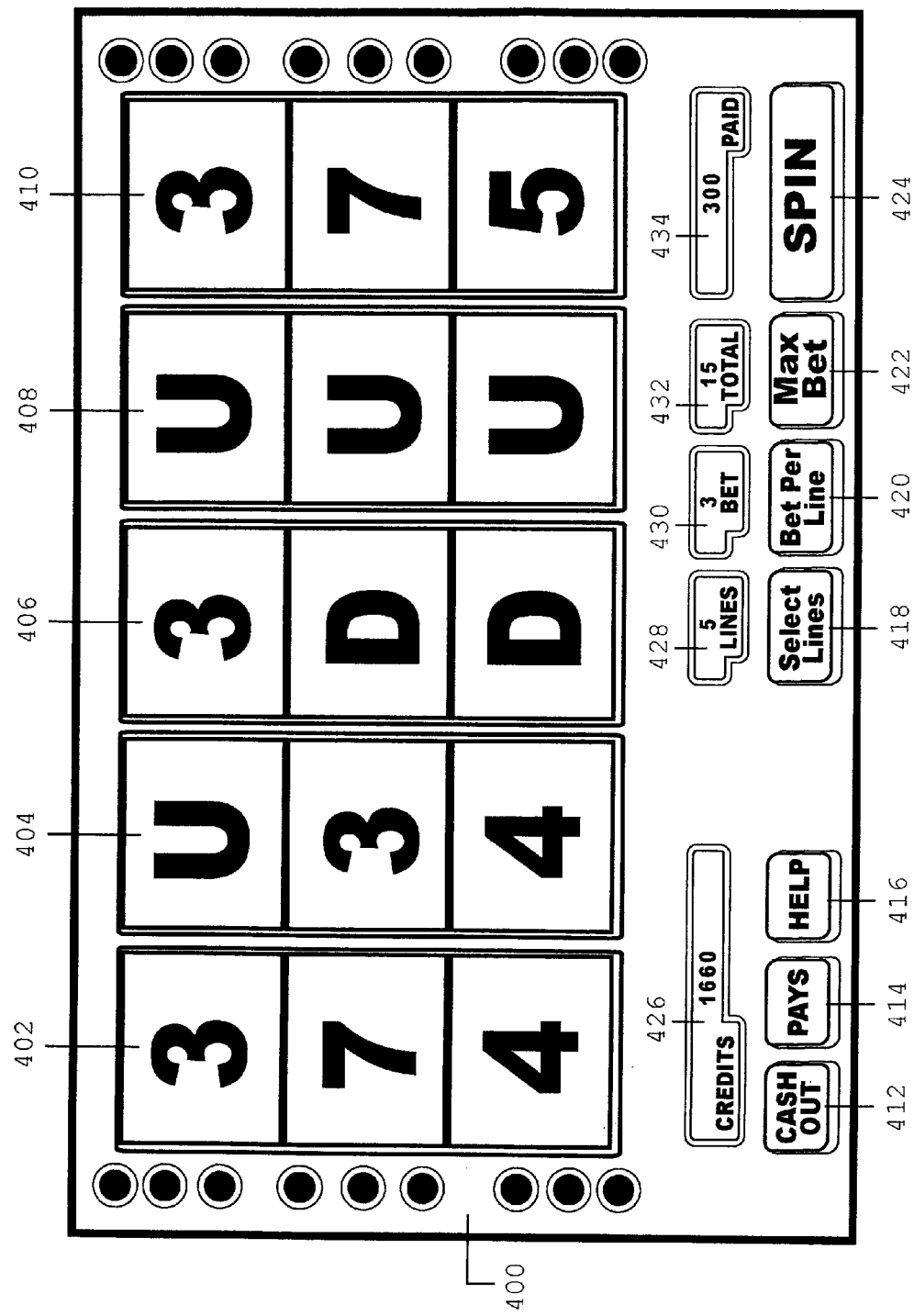
Figure 4G:
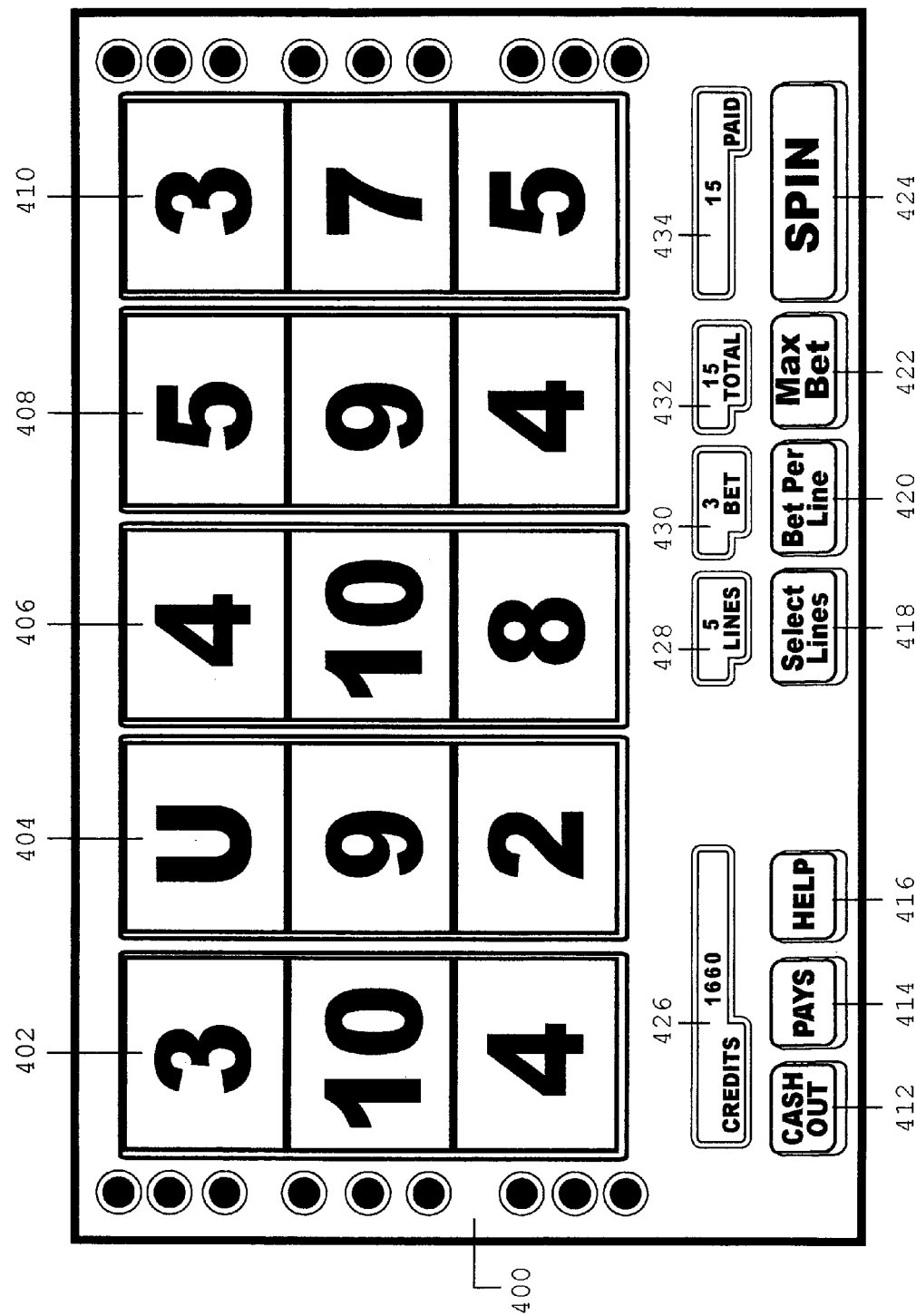
Figure 4H:
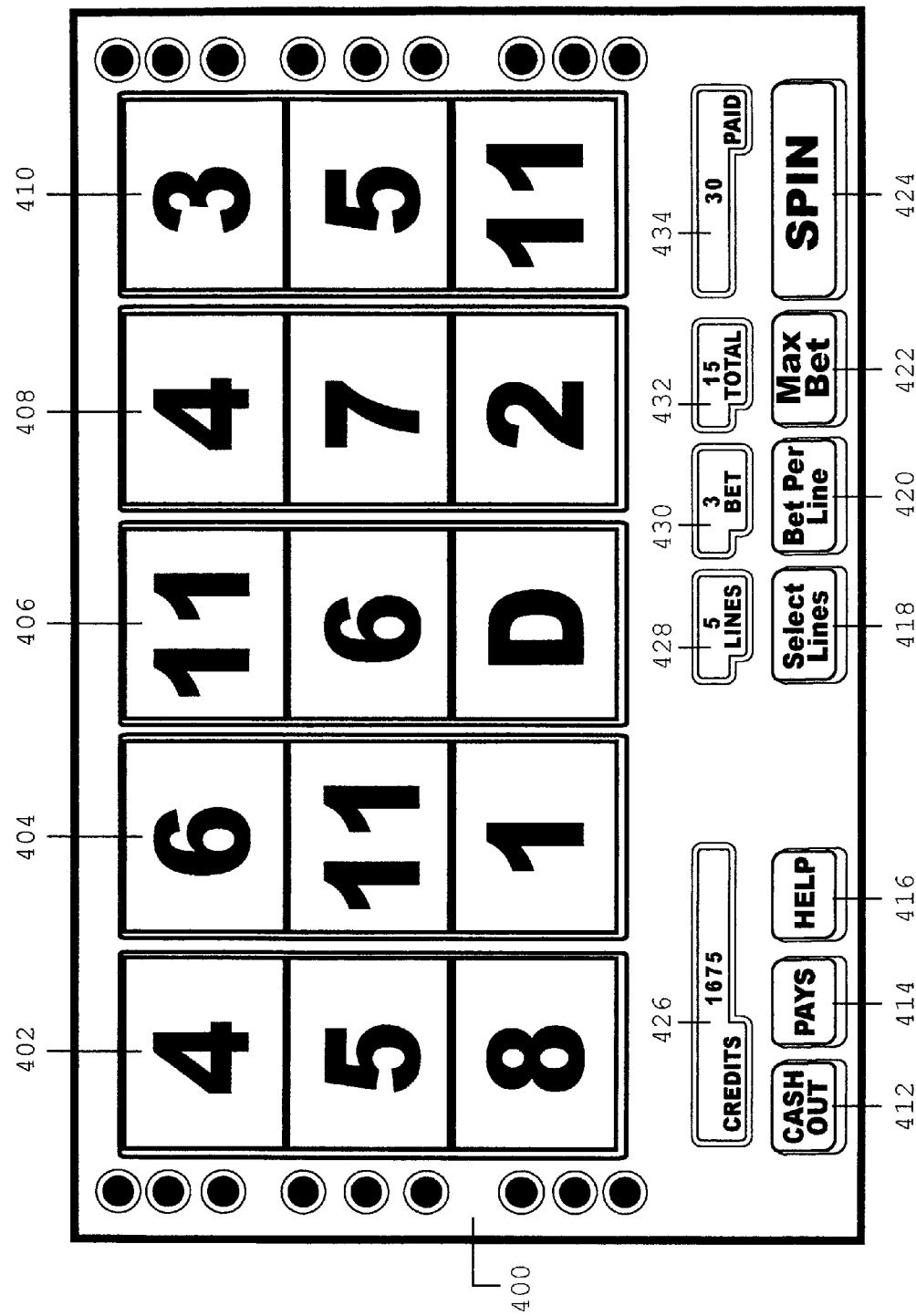

FIGS. 4g and 4h show scatter symbols 10 and 11. Scatter symbols provide scatter pays for any one or more scatter symbols appearing anywhere on a pay line (line-scatter pay; 10) or anywhere on the slot reels (reel-scatter pay; 11).

FIGS. 4a-f show Directional Wild symbols U (upwards) and D (downwards). Directional Wild symbols expand in a pre-determined vertical direction in the symbol matrix. All of the resulting wild symbols act as any base symbol to help form winning combinations on active pay lines.

Winning Symbol Combinations. FIGS. 4a-h show different types of winning symbol combinations:

FIGS. 4a-f show line pays formed using base symbols and directional wild symbols on the slot reels 402-410.

FIGS. 4a and 4b show the slot reels before and after the expansion of the directional wild symbols. In FIG. 4a, a downward directional wild symbol ("D") appears in the top symbol position of slot reel 406. In FIG. 4b, the D symbol expands downwards into the middle and bottom symbol positions of reel 406.

FIGS. 4c and 4d show the slot reels before and after the expansion of the directional wild symbols. In FIG. 4c, an upward direction symbol ("U") appears in the middle position of slot reel 404 and a D symbol appears in the bottom symbol position of slot reel 406. In FIG. 4d, the U expands upwards into the top position of slot reel 404 and the D does not expand since it is already in the bottom position of slot reel 406.

FIGS. 4e and 4f show the slot reels before and after the expansion of the directional wild symbols. In FIG. 4e, a U symbol appears in the top position of slot reel 404, a D symbol appears in the top symbol position of slot reel 406, and another U symbol appears in the bottom position of slot reel 408. In FIG. 4f, the U does not expand since it is already in the top position of slot reel 404. The D expands downwards into bottom position of slot reel 406, and the other U symbol expands into the middle and top positions of slot reel 408.

FIG. 4g shows a line-scatter pay of two "10" symbols on pay line 1, at slot reels 402 and 406.

FIG. 4k shows a reel-scatter pay of three "11" symbols on slot reels 404, 406, and 410.

Alternatively, any pre-determined arrangement of symbols may be designated as winning symbol combinations.

Base Game Example. Sam Slotsky is standing in front of a nickel-denomination version of the preferred embodiment of the present invention. Sam sees slot game on the slot game on a video display 400, illustrated for example in FIG. 4a. The slot game uses a 5-column by 3-row symbol matrix, as shown on the slot reels 402-410. For this example, video display 400 is populated with symbols and/or information described below which replaces the symbols and/or information currently displayed in FIG. 4a.

Below the video display 400, the button panel holds seven buttons: Cash Out 412, Pay Table 414, Help 416, Select Pay Lines 418, Bet Per Line 420, Bet Max 422, and Spin 424. In addition, there are also five meters on the video display 400 below the game: Credits 426, Number of Pay Lines 428, Amount Bet Per Line 430, Total Bet 432 and Paid 434.

Sam presses the Pay Table button 414 to view the pays for winning combinations:

| PAYTABLE | | | |
|---|---|---|---|
| 9-9-9-9-9 . . . 10000 | 9-9-9-9 . . . 400 | 9-9-9 . . . 200 | 9-9 . . . 5 |
| 8-8-8-8-8 . . . 500 | 8-8-8-8 . . . 200 | 8-8-8 . . . 100 | 8-8 . . . 4 |
| 7-7-7-7-7 . . . 240 | 7-7-7-7 . . . 120 | 7-7-7 . . . 60 | 7-7 . . . 3 |
| 6-6-6-6-6 . . . 160 | 6-6-6-6 . . . 80 | 6-6-6 . . . 40 | 6-6 . . . 2 |
| 5-5-5-5-5 . . . 100 | 5-5-5-5 . . . 50 | 5-5-5 . . . 25 | |
| 4-4-4-4-4 . . . 40 | 4-4-4-4 . . . 20 | 4-4-4 . . . 10 | |
| 3-3-3-3-3 . . . 40 | 3-3-3-3 . . . 20 | 3-3-3 . . . 10 | |
| 2-2-2-2-2 . . . 20 | 2-2-2-2 . . . 10 | 2-2-2 . . . 5 | |
| 1-1-1-1-1 . . . 20 | 1-1-1-1 . . . 10 | 1-1-1 . . . 5 | |

After viewing the pay table, Sam deposits $20 into the bill receptor and the Credits meter 426 counts up from 0 to 400 since the denomination for this game is five cents per credit. Sam then his chooses the wager for the game:

The game's Number of Pay Lines meter 428 reads 1. Sam presses the Select Pay Lines button 418 four times and the Number of Pay Lines meter 428 counts up from 1 to 5. An exemplary set of paylines used in this example is illustrated in FIG. 5. As Sam presses the Select Pay Lines button 418, the video display 400 shows the locations of each selected pay line on the slot reels 402-410. For example, the first pay line 502 starts in the middle row of slot reel 402 and proceeds in the straight line through the middle position of slot reels 404-410;

The game's Amount Bet Per Line meter 430 reads 1. Sam presses the Bet Per Line button 420 two times and the Amount Bet Per Line meter 430 counts up from 1 to 3;

The Total Bet meter 432 started at 1, but after Sam's adjustments it now reads 15; and The Paid meter 434 reads 0.

After setting his wager, Sam presses the spin button 424. The Credits meter 426 counts down from 400 to 385. The slot reels 402-410 spin, stop, and display the following symbols. [Hereafter the numbers 1 to 9 represent the base symbol set, 10 is a line-scatter symbol, 11 is a reel-scatter symbol, U is an upwards directional wild symbol, and D is a downwards directional wild symbol.]

| FIG. 4a: Before directional wild symbols expand | | | | |
| --- | --- | --- | --- | --- |
| 9 | 7 | D | 8 | 1 |
| 5 | 5 | 9 | 6 | 2 |
| 3 | 8 | 2 | 4 | 5 |

| FIG. 4b: After directional wild symbols expand | | | | |
| --- | --- | --- | --- | --- |
| 9 | 7 | D | 8 | 1 |
| 5 | 5 | D | 6 | 2 |
| 3 | 8 | D | 4 | 5 |

(Winning combination in bold.)

The "before" symbol matrix contained no winning combinations. The "after" symbol matrix, however, contains a winning 5-5-D combination on pay line 1 at 502. The winning combination is formed by the extension of the D wild symbol from the top position of slot reel 406 into the middle and bottom positions of slot reel 406.

The game awards 75 credits for the winning symbol combination of 5-5-D. The D symbol is wild and acts as a 5 symbol to make the 5-5-5 combination. The 75 credit award reflects the game's pay table which states that 5-5-5 pays 25 credits for each credit wagered upon the pay line (e.g., 25 credits times 3 credits wagered on the pay line). The Credits meter 426 counts up from 385 to 460 and the game Paid meter 434 reads 75.

Again, Sam presses the spin button 424. The Credits meter 426 counts down from 460 to 445. The slot reels 402-410 spin, stop, and display the following symbols:

| FIG. 4c: Before directional wild symbols expand | | | | |
| --- | --- | --- | --- | --- |
| 8 | 7 | 8 | 8 | 5 |
| 3 | U | 7 | 5 | 2 |
| 4 | 4 | D | 6 | 3 |

(Winning combinations in bold.)

| FIG. 4d: After directional wild symbols expand | | | | |
| --- | --- | --- | --- | --- |
| 8 | U | 8 | 8 | 5 |
| 3 | U | 7 | 5 | 2 |
| 4 | 4 | D | 6 | 3 |

(Winning combinations in bold.)

The "before" symbol matrix contains 2 winning combinations of 8-U-D on pay line 4 at 508 and 4-4-D on pay line 3 at 506. The "after" symbol matrix, contains an additional winning combination of 8-U-8-8 on pay line 1 at 502. The additional winning combination is formed by the extension of the U wild symbol from the middle position of slot reel 404 into the top position of slot reel 404.

The game awards 930 credits for the winning combinations, as follows:

The game awards 300 credits for the winning symbol combination of 8-U-D. The U and D symbols are wild and act as 8 symbols to make the 8-8-8 combination. The 300 credit award reflects the game's pay table which states that 8-8-8 pays 100 credits for each credit wagered upon the pay line (e.g., 100 credits times 3 credits wagered on the pay line).

The game awards 30 credits for the winning symbol combination of 4-4-D. The D symbol is wild and acts as a 4 symbol to make the 4-4-4 combination. The 30 credit award reflects the game's pay table which states that 4-4-4 pays 10 credits for each credit wagered upon the pay line (e.g., 10 credits times 3 credits wagered on the pay line).

The game awards 600 credits for the winning symbol combination of 8-U-8-8. The U symbol is wild and act as an 8 symbol to make the 8-8-8-8 combination. The 600 credit award reflects the game's pay table which states that 8-8-8-8 pays 200 credits for each credit wagered upon the pay line (e.g., 200 credits times 3 credits wagered on the pay line).

The Credits meter 426 counts up from 445 to 1375 and the game Paid meter 434 reads 930.

Again, Sam presses the spin button 424. The Credits meter 426 counts down from 460 to 445. The slot reels 402-410 spin, stop, and display the following symbols:

| FIG. 4e: Before directional wild symbols expand | | | | |
| --- | --- | --- | --- | --- |
| 3 | U | 3 | 4 | 3 |
| 7 | 3 | D | 9 | 7 |
| 4 | 4 | 6 | U | 5 |

(Winning combination in bold.)

| FIG. 4f: After directional wild symbols expand | | | | |
| --- | --- | --- | --- | --- |
| 3 | U | 3 | U | 3 |
| 7 | 3 | D | U | 7 |
| 4 | 4 | D | U | 5 |

(Winning combinations in bold.)

The "before" symbol matrix contains 1 winning combination of 3-U-3 on pay line 2 at 504. The "after" symbol matrix, extends the 3-U-3 combination into 3-U-3-U-3 and also contains an additional 2 winning combinations of 4-4-D-U on pay line 3 at 506 and 3-3-D-U-3 on pay line 4 at 508. The additional winning combinations are formed by the extension of the D wild symbol from the middle position of slot reel 406 into the bottom position of slot reel 406 and the extension of the U wild symbol from the bottom position of slot reel 408 into the middle and top position of slot reel 408.

The game awards 300 credits for the winning combinations, as follows:

The game awards 120 credits for the winning symbol combination of 3-U-3-U-3. The U symbols are wild and act as 3 symbols to make the 3-3-3-3-3 combination. The 120 credit award reflects the game's pay table which states that 3-3-3-3-3 pays 40 credits for each credit wagered upon the pay line (e.g., 40 credits times 3 credits wagered on the pay line). [Note that the game only awards credits for the 3-U-3-U-3 combination formed after expansion; no credits are issued for the 3-U-3 combination formed before expansion. However, in alternative embodiments, credits may be issued prior to, and after expansion.]

The game awards 60 credits for the winning symbol combination of 4-4-D-U. The D and U symbols are wild and acts as 4 symbols to make the 4-4-4-4 combination. The 60 credit award reflects the game's pay table which states that 4-4-4-4 pays 20 credits for each credit wagered upon the pay line (e.g., 20 credits times 3 credits wagered on the pay line).

The game awards 120 credits for the winning symbol combination of 3-3-D-U-3. The U symbols are wild and act as 3 symbols to make the 3-3-3-3-3 combination. The 120 credit award reflects the game's pay table which states that 3-3-D-U-3 pays 40 credits for each credit wagered upon the pay line (e.g., 40 credits times 3 credits wagered on the pay line).

The Credits meter 426 counts up from 1360 to 1660 and the game Paid meter 434 reads 300.

Content with his winnings, Sam presses the Cash Out button 412. The gaming device issues 1660 nickels or any other form of currency, including cash, an EZ-PAY™ ticket, or electronic payment.

Additional Features. During play of the base game, the player may receive pays for additional features, such as line and reel scatter pays.

Scatter Pays. FIGS. 4g and 4h show scatter pays that award the player a predetermined payout for the appearance of line and reel scatter symbols on the slot reels 402-410:

FIG. 4g shows a "line scatter pay" that issues awards for the 2 scatter symbols "11" on pay line 1 at 502; and FIG. 4h shows a "reel scatter pay" that issues awards for 3 scatter symbols "12" on the slot reels 402-410.

Note that the U and D directional wild symbols in FIGS. 4g and 4h do not act as scatter symbols. Alternatively, directional wild symbols may also act as any or all types of scatter symbols, and optionally simultaneously therewith.

The Scatter pays illustrated in FIG. 4g or 4h issue a specific number of credits. The credits may be issued immediately or after the completion of a bonus feature e.g., animation sequence or animated bonus game). The calculation of the scatter pay award depends on the type of scatter pay:

For the line scatter pay, the number of credits wagered on the winning pay line multiplies the number of credits indicated by the pay table. In FIG. 4g, the player wagered three credits each on five pay lines and collected three times the amount indicated on the pay table.

For the reel scatter pay, the total number of credits wagered multiplies the number of credits indicated by the pay table. In FIG. 4h, the player wagered fifteen total credits and collected fifteen times the amount indicated on the pay table.

In a preferred embodiment of the present invention, there are scatter pays for symbol 10 and symbol 11, as follows:

| 10 Symbol Award Schedule |
| --- |
| 2 - "10"s anywhere on a pay line pays 5× line bet |
| 3 - "10"s anywhere on a pay line pays 15× line bet |
| 4 - "10"s anywhere on a pay line pays 50× line bet |
| 5 - "10"s anywhere on a pay line pays 500× line bet |

| 11 Symbol Award Schedule |
| --- |
| 3 - "11"s anywhere on the reels pays 2× total bet |
| 4 - "11"s anywhere on the reels pays 10× total bet |
| 5 - "11"s anywhere on the reels pays 25× total bet |

Alternatively, any award schedule may be used to pay for any pre-determined arrangement of scatter symbols—line-scatter or reel-scatter.

Having thus described our invention, what we claim as new and desire to secure by Letters Patent is as follows:

1. A method of playing a slot machine game on a computer-based slot machine having at least a processing unit and a display device, the slot machine game using a symbol matrix formed by a plurality of rows intersecting with a plurality of columns, with the plurality of rows and columns including a plurality of symbols, comprising:

a) a player making a wager to play the game via a wager input device of the computer-based slot machine;

b) the processing unit randomly rearranging the plurality of symbols;

c) displaying the rearranged symbols in the symbol matrix on the display device;

d) the processing unit automatically expanding wildcard symbols, if displayed in the symbol matrix, such that each wildcard symbol:

i) expands by simultaneously occupying two or more positions in the symbol matrix; and ii) expands in all possible directions assigned by directional indicia displayed on said wildcard symbol;

e) the processing unit always replacing each symbol in the path of an expanding wildcard symbol with the expanding wildcard symbol;

f) the processing unit evaluating winning symbol combinations formed using expanded wildcard symbols, wherein each said wildcard symbol may act as any other symbol of the plurality of symbols in order to form a winning symbol combination; and g) the processing unit issuing awards for winning symbol combinations following the expansion of all wildcard symbols.

2. The method of claim 1 in which the directional indicia for a wildcard symbol assigns one or more of the following possible directions:

a) upwards from the symbol position in which the wildcard symbol appears;

b) downwards from the symbol position in which the wildcard symbol appears;

c) leftwards from the symbol position in which the wildcard symbol appears;

d) rightwards from the symbol position in which the wildcard symbol appears; or
e) diagonally from the symbol position in which the wildcard symbol appears.

3. The method of claim 1 in which letters or words are used as directional indicia displayed on the wildcard symbols.

* * * * *